United States Patent Office 3,414,601
Patented Dec. 3, 1968

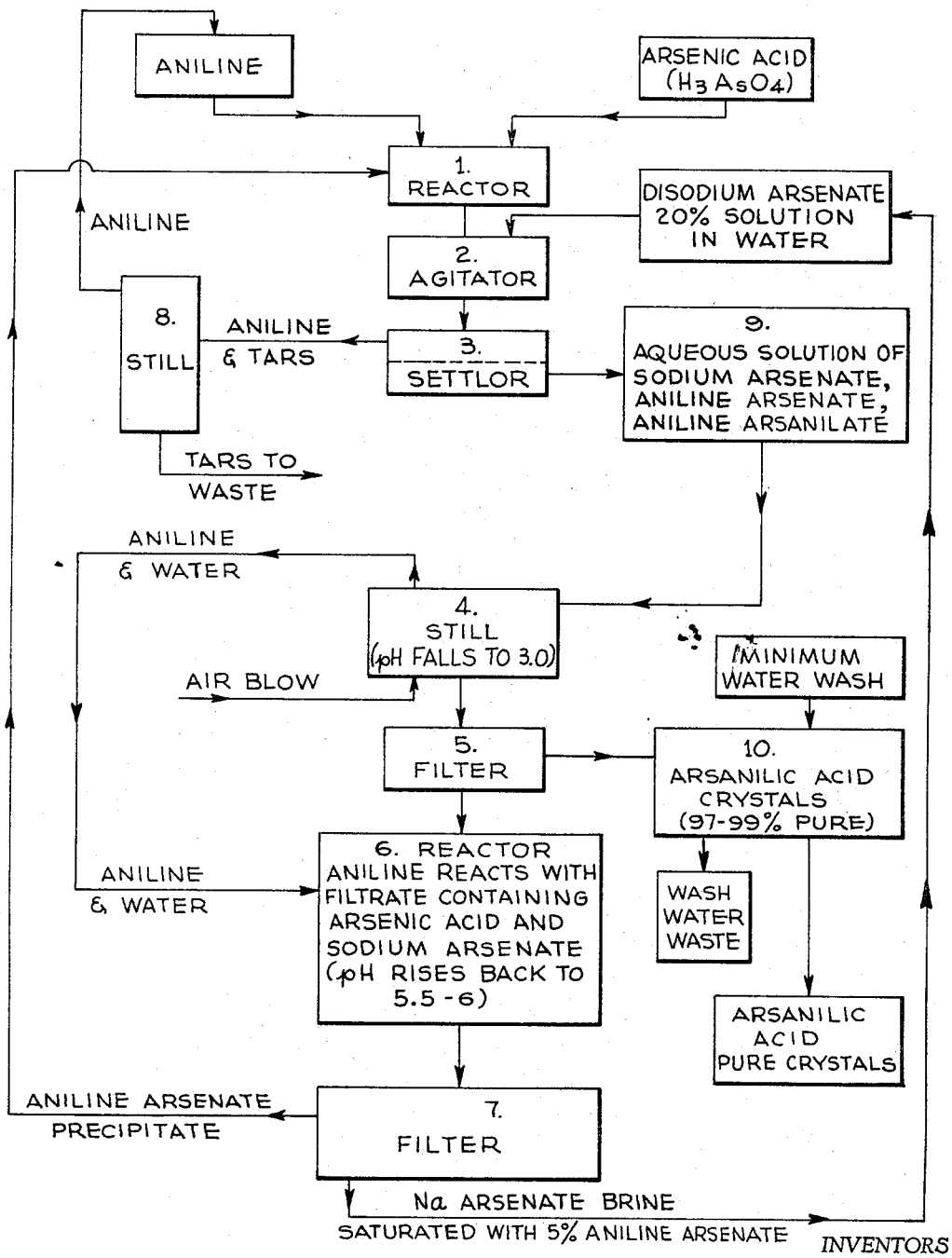

3,414,601
PROCESS FOR RECOVERY OF ARSANILIC ACID
Lewis P. Harris, Fanwood, and Earl F. Rothemich, Califon, N.J., assignors to The Sherwin-Williams Company, Cleveland, Ohio, a corporation of Ohio
Filed Jan. 20, 1966, Ser. No. 521,890
14 Claims. (Cl. 260—442)

This invention relates to a process for recovery of arsanilic acid. More specifically, it relates to a process for the separation and purification of arsanilic acid from a mixture containing aniline, aniline arsenate and aniline arsanilate. Still more specifically, it relates to a process whereby excess aniline and tars are separated from said mixture by the addition of a brine or aqueous solution as described more fully hereinafter but preferably of disodium arsenate. Most importantly this invention also relates to an improvement in arsanilic recovery systems for the simple and substantially complete recovery of unreacted arsenic acid for subsequent use.

Various processes have been proposed for the preparation of arsanilic acid. Two such processes which have been put into commercial production are known as the Abbott method, described in Patent No. 2,677,696, and the Squibb method described in Patent No. 2,245,572. These processes have certain disadvantages which are enumerated below.

Both of these processes start with the Béchamp reaction wherein arsenic acid ($H_3AsO_4$) is reacted with a considerable excess of aniline, generally 3–5 moles of aniline per mole of arsenic acid at 155–165° C. for 2–4 hours to give arsanilic acid which has the formula

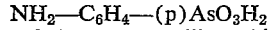
$$NH_2—C_6H_4—(p)AsO_3H_2$$

In the presence of the excess aniline, this acid is in the form of aniline arsanilate. Also present are aniline arsenate and excess aniline. Although yields of 20–38% have been reported on the basis of the arsenic acid input, it has been found that yields are generally about 25%.

In the Abbott method of recovering the arsanilic acid, the aniline-arsenic acid Béchamp reaction mixture is caused to separate into two phases by the addition of "substantially pure water." These phases are separated from each other. The upper aniline-tar layer is distilled to recover aniline and the tar residue is discarded.

The aqueous bottom layer is decolorized and filtered and is then either steam distilled or extracted with benzene, etc. to remove aniline which is present in the water phase as aniline arsenate and aniline arsanilate. This removal of the aniline liberates arsenic acid which causes the pH to be lowered to 2.5–3. When the resultant solution is cooled and allowed to stand, crude arsanilic acid crystals are precipitated and subsequently separated by filtration. The filtrate is concentrated by evaporation of water and the recovered arsenic acid is reused.

This process has the disadvantages that there is poor separation of the aqueous-aniline phases of the original reaction mixture, and water must be evaporated in order to recover the arsenic acid.

In the Squibb method, the Béchamp reaction mixture is extracted by the addition of aqueous sodium hydroxide to a pH of 9.0. Then the resultant two phases are separated with the aniline being rceovered from the upper layer by distillation and the resultant tar residue is discarded.

The aqueous lower layer is decolorized and filtered. This aqueous sodium hydroxide layer contains trisodium arsenate and sodium arsanilate.

Hydrochloric acid is carefully added. This solution must be diluted to keep the sodium arsenate and sodium chloride from precipitating. After the diluted solution is cooled and allowed to stand, the precipitated arsanilic acid is filtered. This arsanilic acid must be recrystallized in water to obtain a highly pure product.

The filtrate is discarded with resultant loss of considerable amounts of arsenate. In addition to the problem of disposing of considerable volumes of waste liquid containing arsenic compound, thereby wasting the arsenic content thereof, this process has the additional disadvantages of using considerable amounts of sodium hydroxide and hydrochloric acid as reagents.

It is obvious therefore that an arsanilic acid recovery process would be desirable which avoids the disadvantage of evaporating waste water for recovery of arsenic acid, as in the Abbott process, and avoids the waste liquor disposal problem, the waste of unreacted arsenic acid and the use of considerable amounts of sodium hydroxide and hydrochloric acid all as in the Squibb method.

These disadvantages are avoided by the process of this invention which has as its main feature the simple and substantially complete recovery of unreacted arsenic acid by the addition of aniline to the filtrate from which precipitated arsanilic acid has been removed. At a pH of 5–6, preferably 5.5–6, the resultant aniline arsenate is precipitated and advantageously recovered for subsequent use in the Béchamp reaction.

Also in accordance with the preferred modification of this invention, the separation of aqueous and non-aqueous phases from the reaction product of the Béchamp reaction is facilitated and improved by the addition of 1–3 volumes, per volume of reaction mixture, of an aqueous solution having a specific gravity in the range of 1.07 to 1.3 or even higher, preferably about 1.1–1.25, the solute in this aqueous solution being a solid which is not soluble in or reactive with aniline, aniline arsenate or aniline arsanilate. This solution is preferably disodium arsenate, hereinafter referred to as sodium arsenate. One advantage of sodium arsenate is that it acts as a buffer in maintaining the desired pH. However, the solute can also advantageously be aniline arsenate (kept hot to prevent precipitation), sodium chloride, calcium chloride, sugar, etc. If necessary the pH can be adjusted to the desired range. The aqueous solution is advantageously added and intimately mixed with the reaction mixture in two or three increments with phase separation being effected after each addition and mixing. The separated aqueous layers are then combined and further processed as described herein.

To obtain the desired specific gravity it is generally necessary to have the solute present in concentrations of at least 10% by weight, preferably about 20%. The upper limit on concentration is governed only by the saturation concentration at room temperature so that this solute does not simultaneously precipitate with and contaminate the arsanilic acid.

This solution is desirably maintained at 60–90° C., preferably about 85° C. In the case of aniline arsenate, precipitation occurs at about 50° C. so it is necessary to stay well above this temperature.

The combined aqueous layers are treated to remove aniline until a pH of 2.5–4, preferably about 3 is reached. At this point arsanilic acid is precipitated upon cooling the solution and allowing it to stand. This removal of aniline is preferably effected by air blowing at raised temperatures, e.g. advantageously 85–120° C., preferably about 110° C., but can also be effected by steam distillation, blowing with inert gases such as nitrogen, methane, ethane, propane, etc., extraction with solvents for aniline which are not soluble in water, such as benzene, toluene, xylene, ether, chloroform, carbon tetrachloride, butanol, pentanol, amyl acetate, butyl acetate, etc.

After the aniline is sufficiently removed to convert the aniline arsenate to free arsenic acid and thereby reduce the pH to about 3, the solution is cooled to room temperature or below, and allowed to stand until the arsanilic acid precipitates. After this precipitate is removed, the filtrate is stirred and treated with excess aniline to convert the arsenic acid to aniline arsenate and give a pH of about 5–6, preferably about 5.5–6. Upon allowing to stand most of the aniline arsenate is precipitated and separated. The filtrate is saturated with aniline arsenate (about 5%) and also contains the solute from the original aqueous solution. This is re-used in subsequent arsanilic acid recovery processing so that even the 5% aniline arsenate is retained in this recovery system.

The arsanilic acid is recovered as substantially pure crystals and substantially all of the unreacted arsenic acid is recovered as aniline arsenate, the major portion of which is precipitated and returned to the Béchamp reactor with the balance being recycled in the aqueous solution of sodium arsenate or other solute. In this way the unreacted arsenic acid is recycled, and the original aqueous solution used for phase separation is also recycled. This improved method avoids wasting the unreacted arsenic acid as in the Squibb method and avoids the water evaporation step of the Abbott process.

The process of this invention is best illustrated by reference to the drawing which shows by flow sheet the various steps involved in the practice of this invention. Aniline and arsenic acid are fed into reactor 1 in which in which the Béchamp reaction is conducted as described above. The resultant reaction mixture is then passed into agitator 2 into which is also passed the brine solution, preferably 20% concentration of disodium arsenate in water. After agitation, the resultant mixture is passed into the settler 3. In actual practice, the reactor, agitator and settler may comprise the same piece of equipment into which the three corresponding steps are performed in sequence. After the two phases are allowed to separate in settler 3, the upper aniline-tar layer is drawn off into still 8 where aniline is distilled and recycled to the aniline supply container. The aniline is advantageously steam distilled or distilled under vacuum. The waste tar is withdrawn from the bottom of the still and discarded.

From settler 3, the aqueous lower layer is withdrawn into container 9. This aqueous solution of sodium arsenate, aniline arsenate and aniline arsanilate is eventually fed into still 4 which is heated to 85–120° C., preferably about 110° C., to effect the removal of the aniline from its salts. Air is blown into the bottom of the still to assist in the removal of the aniline, together with some water. Upon removal of the aniline, arsenic acid is released and causes the pH to fall to about 3.0. The arsanilic acid is also liberated by the removal of aniline. The resultant aqueous solution is allowed to cool and stand, and upon precipitation of the arsanilic acid is passed into filter 5. Arsanilic acid crystals of 97 to 99% purity are recovered by filtration and given a minimum water wash in container 10 to give substantially pure crystals.

The filtrate from filter 5 is passed into reactor 6 into which the aniline and water which has been distilled out of still 4 is also passed and stirred so that the aniline reacts with the arsenic acid in the filtrate. This causes the pH to rise back to 5.5–6. Upon cooling this reaction mixture to room temperature and allowing it to stand, aniline arsenate is precipitated. This is separated in filter 7, and the resultant filtrate comprises sodium arsenate brine saturated with 5% aniline arsenate. This sodium arsenate brine is recycled to the sodium arsenate brine supply container for subsequent use. The aniline arsenate crystals recovered from filter 7 are recycled to reactor 1.

It is obvious from the foregoing description that the arsenate component is completely used, that there is no waste liquor to dispose of, the only waste being the tar from the still 8 used to recover the aniline which is common to all procedures, and the small amount of wash water emanating from container 10 in which the arsanilic acid is washed to remove traces of impurities. It can be seen therefore that there is maximum efficiency in the use of the arsenic acid, and that the aniline is used completely except for the amount lost as tar by-product, and that the arsanilic acid is recovered in comparatively pure crystalline form.

Another important aspect of this invention is the use of the brine solution to effect an improved separation of the two phases from the original reaction mixture. This improved separation results in more complete removal of excess aniline. In the Abbott process, there is poor separation of these two phases. While there is improved separation of these two phases in the Abbott method, this is effected by neutralization with sodium hydroxide, which eventually requires the addition of hydrochloric acid to liberate the arsanilic acid. The present process effects good separation of the two phases without any neutralization or acid liberation steps, and instead uses a brine or solution which can be recovered and recycled for reuse.

Since the arsenic acid, the excess aniline and the salting out agent are all recovered and recycled, there is an overall maximum efficiency. Moreover, there is improved separation of the phases from the original reaction mixture and the arsenic component is recovered for reuse without the evaporation of water as in the Abbott process.

In removing the aqueous layer from the bottom of the settler and while retaining it in container 9, the solution is advantageously kept hot, approximately 60–90° C., preferably about 85° C., to prevent precipitation of aniline arsenate. After this hot solution is introduced into still 4 and aniline is distilled, the liberation of arsenic acid reduces the pH to about 3.0. This can be tested with Congo red paper or other suitable indicator. After precipitation of the arsanilic acid and removal by filtration, the introduction of aniline and its reaction with the arsenic acid in the filtrate brings the pH back to 5.5–6.

The invention is best illustrated by the following examples. These examples are given for the purpose of illustration and it is not intended that the scope of the invention or the manner in which it may be practiced is to be restricted in any way by these illustrations. Except where specifically indicated otherwise, parts and percentages are given by weight.

EXAMPLE I

Commercial arsenic acid (75%) equivalent to 142 parts of 100% acid and 465 parts of aniline are introduced into a reactor equipped with stirrer and temperature control means. The mixture is heated for 30 minutes at 135° C. and then for 1½ hours at 160–165° C. Then a 20% aqueous solution of disodium arsenate (sp. gr. 1.205) totaling 3 volumes per volume of reaction mixture is added in three equal increments. After each increment of solution is added and agitated with the reaction mixture, at a temperature of 80–85° C., the resultant mixture is allowed to settle into two phases and the lower aqueous layer drawn off each time. The three aqueous layers are combined. The hot brine or composite of aqueous layers contains aniline arsanilate, and aniline arsenate in addition to the sodium arsenate. This is placed in a flask and maintained at a temperature of about 110° C., while a stream of air is blown through until a simple removed from the flask gives a positive pH change with Congo red paper. The contents of the flask are then allowed to cool and arsanilic acid permitted to precipitate.

In two hours, 40 grams of arsanilic acid per liter of brine is precipitated. Upon standing an additional 48 hours, 15 more grams are precipitated per liter of brine. After a minimum water wash, a substantially pure arsanilic acid is obtained. The yield of arsanilic acid is approximately 55 parts, which represents a conversion of 25.4% based on the arsenic acid.

Similar results are obtained when the above procedure is repeated using equivalent proportions of 85% and 90% arsenic acid respectively in place of the 75% acid used above.

After the aniline is stripped from the brine solution to leave arsanilic acid and arsenic acid at a pH of 3, the brine is kept hot during decolorizing with charcoal, filtered while hot to remove charcoal, and then allowed to stand until cold. If arsanilic acid does not separate at once, precipitation may be initiated by seeding with crystals of arsanilic acid. The precipitated arsanilic acid is filtered from the brine. The filtrate is combined with condensed aniline from the stripping still, and the resultant precipitated aniline arsenate is filtered and returned to the Bêchamp reactor. The brine saturated with 5% aniline arsenate is recycled to the brine supply container.

EXAMPLE II

The procedure of Example I is repeated using, in place of the sodium arsenate solution, solutions of 20 percent by weight of aniline arsenate (maintained at approximately 85° C.), sodium chloride, calcium chloride and sugar respectively. In each case, satisfactory precipitation of the arsanilic acid is achieved and the predominate portion of the arsenic acid is recovered as aniline arsenate. Also the remaining brine, containing a small percentage of aniline arsanilate, is recovered for subsequent reuse.

As indicated above, the use of the brine or solution of selected specific gravity for facilitating and improving the separation of phases is advantageously achieved by using the indicated volume of brine in two or three increments of approximately equal volume. Then the aqueous layers collected in the separation are combined and treated for subsequent recovery of the arsanilic acid and also recovery of the arsenic acid in the form of aniline arsenate.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. In the process for recovering arsanilic acid from a mixture containing excess aniline and the arsanilic acid in the form of the aniline arsanilate, the improvement comprising the steps of
    (a) adding to said mixture a solution having a specific gravity in the range of 1.07–1.3 and having as the solute a solid which is insoluble in aniline and non-reactive with aniline, aniline arsenate and aniline arsanilate, said solution being added in a proportion of about 1–3 volumes per volume of said mixture;
    (b) thoroughly mixing said solution and said mixture containing aniline arsanilate at a pH in the range of 5–6;
    (c) allowing the resultant mixture to separate into a non-aqueous layer and an aqueous layer;
    (d) separating said non-aqueous layer from said aqueous layer;
    (e) distilling aniline from said non-aqueous layer;
    (f) distilling aniline and water from said aqueous layer until the pH drops to approximately 2.5–4;
    (g) allowing the residue from said distillation of said aqueous layer to cool to approximately room temperature, whereby arsanilic acid crystals are precipitated therefrom;
    (h) separating said arsanilic acid crystals from the solution from which they were precipitated;
    (i) introducing aniline into said separated solution from which said arsanilic acid crystals have been separated until a pH of 5–6 has been reached and allowing said aniline to react with arsenic acid in said solution to form aniline arsenate;
    (j) allowing said solution containing aniline arsenate to cool and stand until aniline arsenate crystals are precipitated therefrom; and
    (k) separating said aniline arsenate crystals from the said solution from which they were precipitated.

2. The process of claim 1, in which the said solution from which said aniline arsenate crystals are separated is reused as said solution having specific gravity in the range of 1.07–1.3.

3. The process of claim 1, in which the aniline introduced into the solution from which arsanilic acid crystals had been separated comprises the aniline and water mixture previously distilled from said aqueous layer.

4. The process of claim 1, in which said solute is sodium arsenate.

5. The process of claim 4, in which said sodium arsenate is present in a concentration of at least 10 percent by weight of said solution.

6. The process of claim 4, in which said sodium arsenate is present in a concentration of about 20 percent by weight of said solution.

7. The process of claim 6, in which said pH range of subparagraph (b) is 5–6.

8. The process of claim 7, in which said pH range of subparagraph (f) is approximately 3.

9. The process of claim 7, in which said pH range of subparagraph (i) is also 5–6.

10. The process of claim 1, in which said solute is aniline arsenate and said solution is maintained at a temperature of 60–90° C.

11. The process of claim 1, in which said solute is sodium chloride.

12. The process of claim 1, in which said solute is calcium chloride.

13. In a process for recovery of arsanilic acid from a mixture of arsanilic acid and arsenic acid wherein said arsanilic acid is precipitated by lowering the pH of the solution to 2.5–4, and wherein arsenic acid is retained in said solution, the improvement comprising the step of adding aniline to said solution and thereby converting said arsenic acid to aniline arsenate and recovering said aniline arsenate.

14. The process of claim 13, in which aniline arsenate is separated from said solution by maintaining the pH of said solution in the range of 5–6, cooling said solution and allowing said solution to stand until said aniline arsenate has precipitated.

References Cited

UNITED STATES PATENTS

| | | | |
|---|---|---|---|
| 1,405,228 | 1/1922 | Koher | 260—442 |
| 2,245,572 | 6/1941 | Christiansen | 260—442 |
| 2,677,696 | 5/1954 | Rundell et al. | 260—442 |
| 3,296,290 | 1/1967 | Berndt et al. | 260—442 |

TOBIAS E. LEVOW, *Primary Examiner.*

W. F. W. BELLAMY, *Assistant Examiner.*